(12) United States Patent
Chumakov

(10) Patent No.: US 11,300,241 B1
(45) Date of Patent: *Apr. 12, 2022

(54) ADJUSTABLE SUPPORT ARM

(71) Applicant: Humanscale Corporation, New York, NY (US)

(72) Inventor: Vladimir Stanislavovich Chumakov, Vaughan (CA)

(73) Assignee: Humanscale Corporation, New York, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/676,844

(22) Filed: Nov. 7, 2019

Related U.S. Application Data

(63) Continuation of application No. 15/486,714, filed on Apr. 13, 2017, now Pat. No. 10,480,709, which is a
(Continued)

(51) Int. Cl.
*F16M 11/10* (2006.01)
*F16M 11/20* (2006.01)
(Continued)

(52) U.S. Cl.
CPC ............. *F16M 11/10* (2013.01); *F16M 11/08* (2013.01); *F16M 11/2014* (2013.01);
(Continued)

(58) Field of Classification Search
CPC .... F16M 11/10; F16M 11/08; F16M 11/2014; F16M 11/2092; F16M 11/24;
(Continued)

(56) References Cited

U.S. PATENT DOCUMENTS

| 1,460,697 A | 7/1923 | Bendelin |
| 2,081,677 A | 5/1937 | O'Neil |
| (Continued) | | |

FOREIGN PATENT DOCUMENTS

| DE | 29908098 | 7/1999 |
| GB | 2294632 | 5/1996 |
| (Continued) | | |

OTHER PUBLICATIONS

International Search Report and Written Opinion dated Jul. 15, 2011, PCT Application No. PCT/US2011/033408, International Filing Date of Apr. 21, 2011.

*Primary Examiner* — Christopher Garft
(74) *Attorney, Agent, or Firm* — Jones Walker LLP

(57) ABSTRACT

An adjustable support arm utilizing an elastomeric member having a dynamic attachment point to support the weight of an attached object. The adjustable support arm can include a lower bracket that is connected to an upper bracket by an upper arm and a lower arm. The elastomeric member counterbalances the weight of an attached object. The first end of the elastomeric member can be attached to a linkage, which can include a first, second, and third link and the second end of the elastomeric member can be attached to one of the arms. The links can be coupled to each other between the upper and lower arms such that the linkage is dynamically moveable upon movement of the support arm.

9 Claims, 13 Drawing Sheets

Related U.S. Application Data continuation of application No. 13/839,835, filed on Mar. 15, 2013, now Pat. No. 9,657,889.

(51) Int. Cl.
*F16M 11/24* (2006.01)
*F16M 13/02* (2006.01)
*F16M 11/08* (2006.01)

(52) U.S. Cl.
CPC ......... *F16M 11/2092* (2013.01); *F16M 11/24* (2013.01); *F16M 13/022* (2013.01); *F16M 2200/04* (2013.01); *F16M 2200/044* (2013.01); *F16M 2200/063* (2013.01)

(58) Field of Classification Search
CPC ............ F16M 13/022; F16M 2200/04; F16M 2200/044; F16M 2200/08; F16M 11/12; F16M 11/04; F16M 11/046; F16M 13/00; F16M 2200/063; F16M 2200/041
See application file for complete search history.

(56) References Cited

U.S. PATENT DOCUMENTS

| | | | |
|---|---|---|---|
| 2,700,524 A | | 1/1955 | Lauterbach |
| 2,943,583 A | * | 7/1960 | Ryan ..................... E02F 5/102 |
| | | | 405/181 |
| 3,297,291 A | | 1/1967 | Everett |
| 4,039,818 A | | 8/1977 | Hickman |
| 4,082,244 A | | 4/1978 | Groff |
| 4,143,652 A | | 3/1979 | Meier et al. |
| 4,266,747 A | | 5/1981 | Souder, Jr. et al. |
| 4,516,751 A | | 5/1985 | Westbrook |
| 4,521,057 A | * | 6/1985 | Varterasian ............ B60N 2/502 |
| | | | 248/562 |
| 4,695,024 A | | 9/1987 | Haven |
| 4,770,384 A | | 9/1988 | Kuwazima et al. |
| 4,836,494 A | | 6/1989 | Johnsen |
| 4,844,387 A | | 7/1989 | Sorgi et al. |
| 4,846,434 A | | 7/1989 | Krogsrud |
| 4,852,500 A | | 8/1989 | Ryburg et al. |
| 5,277,392 A | | 1/1994 | Rossman et al. |
| 5,358,352 A | | 10/1994 | Klarhorst |
| 5,687,939 A | | 11/1997 | Moscovitch |
| 5,720,369 A | | 2/1998 | Thorn |
| 5,743,503 A | | 4/1998 | Voeller et al. |
| 5,826,846 A | | 10/1998 | Buccier et al. |
| 5,860,628 A | | 1/1999 | Miani et al. |
| 5,971,348 A | | 10/1999 | Thomas |
| 5,975,472 A | | 11/1999 | Hung |
| 5,992,809 A | | 11/1999 | Sweere et al. |
| 6,010,017 A | | 1/2000 | Michaelis et al. |
| 6,012,693 A | * | 1/2000 | Voeller ................. F16M 11/048 |
| | | | 248/279.1 |
| 6,076,785 A | | 6/2000 | Oddsen, Jr. |
| 6,149,253 A | | 11/2000 | Talasani |
| RE36,978 E | | 12/2000 | Moscovitch |
| 6,189,849 B1 | | 2/2001 | Sweere et al. |
| 6,390,433 B1 | | 5/2002 | Kasa-Djukic |
| 6,419,196 B1 | | 7/2002 | Sweere et al. |
| 6,481,675 B1 | | 11/2002 | Yoon |
| 6,505,988 B1 | | 1/2003 | Oddsen, Jr. |
| 6,695,270 B1 | | 2/2004 | Smed |
| 6,736,364 B2 | | 5/2004 | Oddsen, Jr. |
| 6,769,657 B1 | | 8/2004 | Huang |
| 6,783,105 B2 | | 8/2004 | Oddsen, Jr. |
| 6,854,698 B2 | | 2/2005 | Oddsen, Jr. |
| 6,857,610 B1 | | 2/2005 | Conner et al. |
| 6,863,252 B2 | | 3/2005 | Bosson |
| 6,915,994 B2 | | 7/2005 | Oddsen, Jr. |
| 6,935,883 B2 | | 8/2005 | Oddsen, Jr. |
| 6,994,306 B1 | | 2/2006 | Sweere et al. |
| 7,014,157 B2 | | 3/2006 | Oddsen |
| 7,044,423 B2 | | 5/2006 | Bober et al. |
| 7,048,242 B2 | | 5/2006 | Oddsen, Jr. |
| 7,063,296 B2 | | 6/2006 | Williams |
| 7,096,560 B2 | | 8/2006 | Oddsen, Jr. |
| 7,100,880 B2 | | 9/2006 | Oddsen, Jr. |
| 7,168,665 B2 | | 1/2007 | Hong et al. |
| D537,323 S | | 2/2007 | Saez |
| 7,195,214 B2 | | 3/2007 | Lee et al. |
| 7,207,537 B2 | | 4/2007 | Hung |
| 7,246,780 B2 | | 7/2007 | Oddsen, Jr. |
| 7,252,277 B2 | | 8/2007 | Sweere et al. |
| 7,389,965 B2 | | 6/2008 | Oddsen, Jr. et al. |
| 7,395,995 B2 | | 7/2008 | Chen |
| 7,398,950 B2 | | 7/2008 | Hung |
| 7,510,155 B2 | | 3/2009 | Huang et al. |
| 7,540,457 B2 | | 6/2009 | Oddsen, Jr. et al. |
| 7,546,994 B2 | | 6/2009 | Altonji et al. |
| 7,562,851 B2 | | 7/2009 | Hein et al. |
| 7,600,728 B2 | | 10/2009 | Petrick et al. |
| 7,644,898 B2 | | 1/2010 | White et al. |
| 7,703,733 B2 | | 4/2010 | Price et al. |
| 7,726,616 B2 | | 6/2010 | Zhang et al. |
| 7,748,666 B2 | * | 7/2010 | Oddsen, Jr ............. F16M 13/02 |
| | | | 248/123.11 |
| 7,810,773 B2 | | 10/2010 | Chi |
| 8,011,632 B2 | | 9/2011 | Wang et al. |
| 8,074,949 B2 | * | 12/2011 | Oddsen, Jr ......... F16M 11/2014 |
| | | | 248/276.1 |
| 8,585,001 B2 | | 11/2013 | Huang |
| 2002/0011544 A1 | | 1/2002 | Bosson |
| 2002/0015296 A1 | | 2/2002 | Howell et al. |
| 2002/0088910 A1 | | 7/2002 | Sweere et al. |
| 2003/0001056 A1 | | 1/2003 | Ihalainen et al. |
| 2003/0024144 A1 | | 2/2003 | Jen |
| 2003/0132356 A1 | | 7/2003 | Copeland |
| 2003/0141425 A1 | | 7/2003 | Obdeijn |
| 2004/0011932 A1 | | 1/2004 | Duff |
| 2004/0031893 A1 | | 2/2004 | Smed |
| 2004/0262474 A1 | | 12/2004 | Boks et al. |
| 2005/0023422 A1 | | 2/2005 | Oddsen, Jr. |
| 2005/0184215 A1 | | 8/2005 | Lin |
| 2006/0076463 A1 | | 4/2006 | Drew |
| 2006/0118686 A1 | | 6/2006 | Hsieh et al. |
| 2006/0157627 A1 | | 7/2006 | Hung |
| 2007/0040084 A1 | | 2/2007 | Sturman et al. |
| 2007/0045488 A1 | | 3/2007 | Shin |
| 2007/0069565 A1 | | 3/2007 | Diffrient |
| 2007/0086155 A1 | | 4/2007 | Chen et al. |
| 2007/0102596 A1 | | 5/2007 | Sung |
| 2007/0108355 A1 | | 5/2007 | Li |
| 2007/0228234 A1 | | 10/2007 | Doyle |
| 2008/0029661 A1 | | 2/2008 | Chen |
| 2008/0093522 A1 | * | 4/2008 | Oddsen ................... F16M 11/38 |
| | | | 248/276.1 |
| 2008/0094792 A1 | | 4/2008 | Chen et al. |
| 2008/0164395 A1 | | 7/2008 | Chang et al. |
| 2010/0072329 A1 | | 3/2010 | Zhang et al. |
| 2010/0123053 A1 | | 5/2010 | Wang |
| 2010/0127144 A1 | | 5/2010 | Lange |
| 2010/0308185 A1 | | 12/2010 | Huang |
| 2011/0147546 A1 | * | 6/2011 | Monsalve .......... F16M 11/2092 |
| | | | 248/122.1 |
| 2011/0260017 A1 | * | 10/2011 | Monsalve ............... F16M 11/24 |
| | | | 248/201 |
| 2011/0315843 A1 | | 12/2011 | Hung |
| 2013/0161465 A1 | | 6/2013 | Huang |
| 2013/0284871 A1 | | 10/2013 | Huang |
| 2013/0322965 A1 | * | 12/2013 | Frelich .................... E01C 19/48 |
| | | | 404/108 |

FOREIGN PATENT DOCUMENTS

| | | |
|---|---|---|
| WO | 8502524 | 6/1985 |
| WO | 2011133757 | 10/2011 |

* cited by examiner

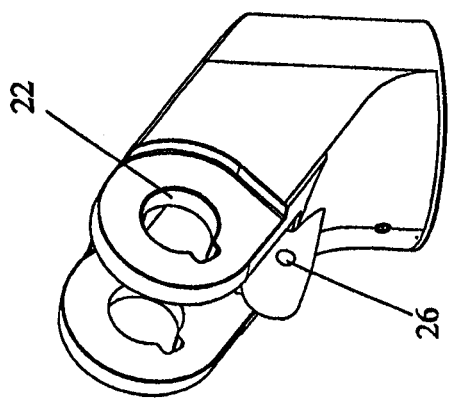
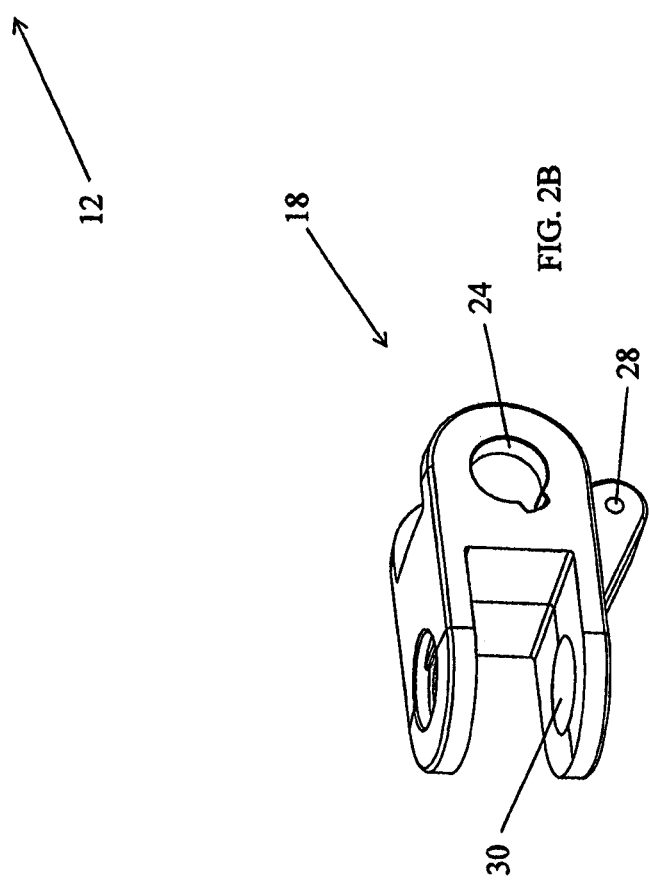
FIG. 2A
FIG. 2B

ADJUSTABLE SUPPORT ARM

CROSS-REFERENCE TO RELATED APPLICATION

This application is a continuation of U.S. application Ser. No. 15/486,714 filed Mar. 13, 2017, which is a continuation of U.S. application Ser. No. 13/839,835 filed Mar. 15, 2013 and issued as U.S. Pat. No. 9,657,889, all of which are hereby incorporated by reference in their entireties.

BACKGROUND OF THE INVENTION

Adjustable support arms are typically utilized for mounting objects such as a flat panel displays, light sources, or work surfaces. Many adjustable support arms utilize a gas cylinder to counterbalance the weight of an attached object. However, in addition to being heavy and bulky, gas cylinders are prone to failure. Moreover, gas cylinders inevitably leak gas and lose pressure and, therefore, have a limited lifespan.

Mechanical springs have been used as an alternative to gas cylinders in adjustable support arms. Support arms utilizing mechanical springs are generally lighter, more compact, and less costly to manufacture and maintain than support arms featuring gas cylinders without sacrificing strength and weight-load capacity. However, mechanical springs present their own performance issues. Typically, one end of a mechanical spring is attached to an upper link of the support arm, while the second end of the spring is attached to a lower link. Yet, when the support arm is brought to its highest vertical position or its lowest vertical position, the spring can be extended beyond a range that is within the tolerances of the spring, causing the spring to exhibit non-linear characteristics. This may be evidenced by a sagging effect when the support arm is brought to its highest position and a creeping effect when the support arm is brought to its lowest position. Repeated over-extension of the spring can ultimately result in spring fatigue or permanent spring deformation.

Additionally, generation adjustable support arms typically utilize frictional forces to supplement the counterbalancing force provided by the gas cylinder or mechanical spring to offset the applied load throughout the support arm's range of motion.

SUMMARY OF THE INVENTION

The invention disclosed herein is generally directed to an adjustable support arm that includes an elastomeric member, which assists in supporting an object that can be mounted to the arm, such as a flat panel display, light source, or work surface. The elastomeric member can be coupled to a linkage, which provides a dynamic attachment point for the elastomeric member. This dynamic attachment point allows the support force provided by the elastomeric member to vary with the position of the support arm. In one embodiment, the dynamic attachment point varies the support force in a fashion that allows the arm to provide an upward torque force that may substantially match the downward torque force produced by an object mounted on the arm. In another embodiment, the dynamic attachment point varies the support force in a fashion that allows the elastomeric member to provide a constant force throughout a range of motion and prevents an over-extension of the spring, thereby allowing the spring to provide a near constant force throughout the support arm's range of motion while also reducing the likelihood of spring fatigue and deformation.

In an embodiment exemplifying the principles of the invention, the adjustable support arm can comprise a first bracket, a second bracket, an upper arm pivotally connected to the first bracket or the second bracket, a lower arm pivotally connected to the first bracket or the second bracket, a first link pivotally connected to the upper arm, a second link pivotally connected to the lower arm, a third link, which can be arranged between the upper and lower arms, pivotally connected to the first link and the second link, and an elastomeric member positioned between the upper arm and the lower arm. The elastomeric member, which can be a spring, can be coupled to the third link and can have a length that expands or contracts relative to a change of angle of the support arm. Also, the upper arm and the lower arm can each be pivotally connected to the first bracket and second bracket.

In another embodiment exemplifying the principles of the invention, the adjustable support arm can comprise a first bracket, a second bracket, an upper arm pivotally connected to the first bracket or the second bracket, a lower arm pivotally connected to the first bracket or the second bracket, a first link pivotally connected to the upper arm, a second link pivotally connected to the lower arm, a third link pivotally connected to the first link and the second link and displaced between the upper arm and the lower arm as the support arm is raised or lowered, and an elastomeric member coupled to the third link. The elastomeric member, which can be a spring, can be coupled to the third link and can have a length that expands or contracts relative to a change of angle of the support arm.

In a further embodiment exemplifying the principles of the invention, the adjustable support arm can comprise a first bracket, a second bracket, an upper arm pivotally connected to the first bracket or the second bracket, a lower arm pivotally connected to the first bracket or the second bracket, a first link pivotally connected to the upper arm, a second link pivotally connected to the lower arm with the first link and the second link pivotally connected to each other to form a linkage, and an elastomeric member, which can be a spring, connected to the linkage. The adjustable support arm can include a fastener that pivotally connects the first link and the second link. Also, the upper arm and the lower arm can each be pivotally connected to the first bracket and the second bracket with the upper arm, the lower arm, the first bracket and the second bracket can form a parallelogram linkage. Moreover, the first link and the second link can each have a length that is substantially equal with the first link pivotable about a first pivot point in the upper arm, and the second link pivotable about a second pivot point in the lower arm where the first pivot point and the second pivot point can be vertically spaced from each other and substantially aligned along a vertical axis in a horizontal position of the adjustable support arm. Moreover, the linkage can form a V-shape having a vertex and an open end such that the vertex is positioned between the elastomeric member and the second bracket. Furthermore, the elastomeric member can extend between the first bracket and the linkage and can have a length that expands or contracts relative to a change of angle of the support arm.

Other applications of the invention are also envisioned, as the invention can readily be used wherever a spring is used in conjunction with a parallelogram linkage.

The above summary is not intended to describe each embodiment or every possible implementation. These and other features, aspects, and advantages of the present inven-

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention:

FIG. 2A is a perspective view of an embodiment of a first bracket of the support arm shown in FIG. 1A;

FIG. 2B is a perspective view of an embodiment of a second bracket of the support arm shown in FIG. 1A;

DETAILED DESCRIPTION OF THE INVENTION

Figure 1A:
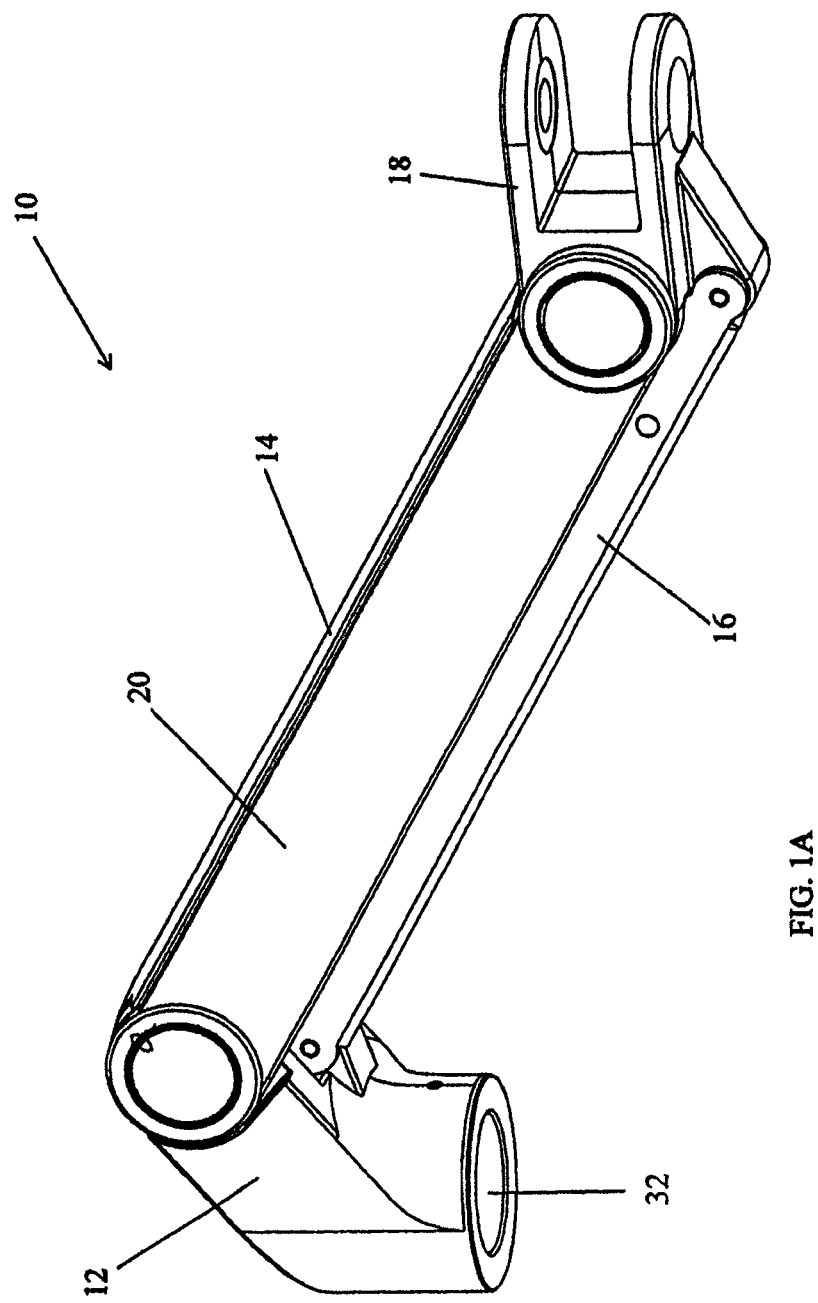
FIG. 1A is a perspective view of an embodiment of an adjustable support arm of the present invention.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions.

Figure 1B:
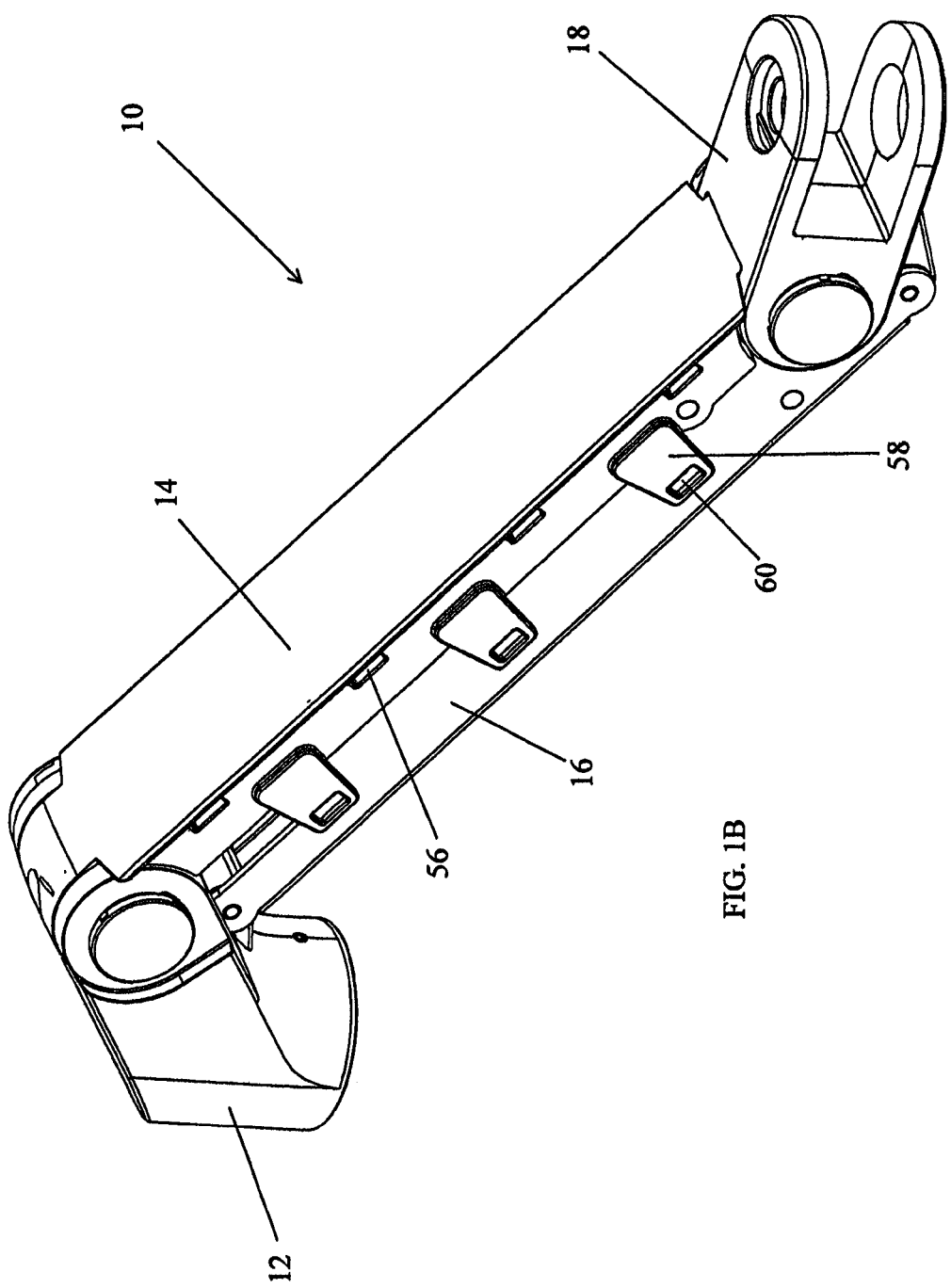
FIG. 1B is a perspective view of the adjustable support arm of FIG. 1A with the cover of the support arm removed.

Referring now to FIGS. 1A and 1B, an embodiment of an adjustable support arm 10 of the present invention is shown. The adjustable support arm 10 can comprise a first bracket 12, an upper arm 14, a lower arm 16, and a second bracket 18, which can form a parallelogram linkage. As shown in FIG. 1A, the upper arm 14 can include a cover 20. In FIG. 1B, the adjustable support arm 10 is shown with the cover 20 removed.

FIGS. 2A and 2B depict an embodiment of the first bracket 12 and the second bracket 18. As shown, both the first bracket 12 and the second bracket 18 can include keyed openings 22, 24, respectively, which are aligned and spaced apart from each other. The keyed openings 22, 24 aid in connecting each bracket 12, 18 to the upper arm 14. Additionally, the first bracket 12 and the second bracket 18 each have through openings 26, 28, respectively, for attachment of each bracket 12, 18 to the lower arm 16. The second bracket 18 further can include a third set of openings 30, which are aligned and spaced apart from each other, to allow for attachment of a device mount assembly (not shown) to mount a display (such as a flat panel display), light source, or other device to the support arm 10. Independent or as part of the device mount assembly, the third set of openings 30 can accommodate, for example, a pivoting axle such that a device can be mounted on the axle and pivot independent of the position of the support arm 10. Alternatively, the second bracket 18 may include a clamp or any other type of device mount.

The support arm 10 can be mounted to a platform assembly (not shown) by coupling to the first bracket 12, which can include a bore 32 (See FIG. 1A), to a platform. Moreover, the platform assembly may allow the first bracket 12 to be rotated, providing an additional degree of freedom to the support arm 10.

Figure 3:
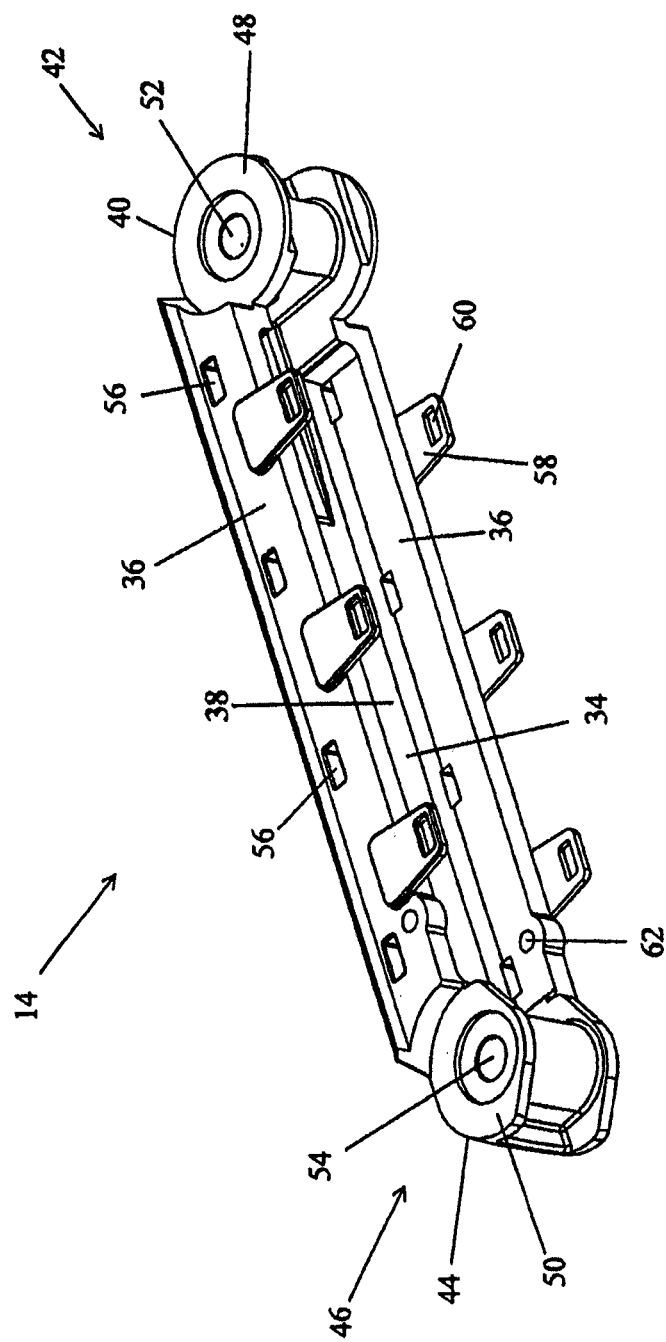
FIG. 3 is a perspective view of an embodiment of an upper arm of the support arm of FIG. 1A.

As shown in an embodiment in FIG. 3, the upper arm 14 can include a base 34, two sidewalls 36 that extend from the base 34 to define a channel 38, a first rounded protrusion 40 that extends from a first end 42 of the upper arm 14, and a second rounded protrusion 44 that extends from a second end 46 of the upper arm 14. The first and second rounded protrusions 40, 44 have sidewalls 48, 50, respectively, which can be recessed from the sidewalls 36 of the base 34 to accommodate the first bracket 12 and the second bracket 18, thereby allowing the upper arm 14 to travel through a vertical range of motion. Aligned openings 52, 54 can extend transversely through each rounded protrusion 40, 44, respectively. Moreover, the upper arm 14 can include a plurality of first slots 56 formed in each sidewall 36. The upper arm 14 can further include a plurality of protrusions 58 that extend from each sidewall 36 and include second slots 60. The first slot 56 and the second slot 60, which can take the shape of any opening or recessed bore, correspond to tabs or protrusions (not shown) that extend from the cover 20 to secure the cover 20 via snap engagement to the upper arm 14. However, any other known form of attachment between the cover 20 to the upper arm 14 can also be utilized. Further, the embodiment illustrated in FIG. 3 can have additional openings 62 in each sidewall 36 of the upper arm 14. These openings 62, which are aligned and extend through each sidewall 36, will be described in conjunction with other embodiments described herein below.

Figure 4:
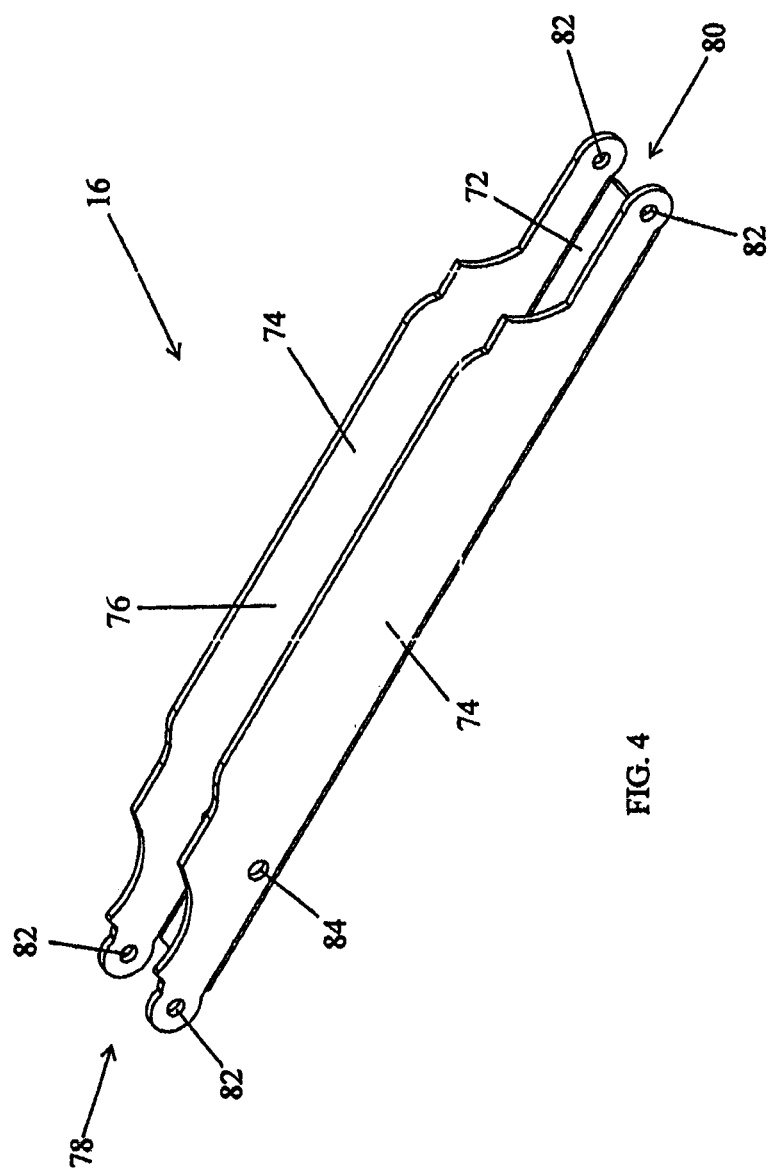
FIG. 4 is a perspective view of an embodiment of a lower arm of the support arm shown in FIG. 1A.
Figure 5:
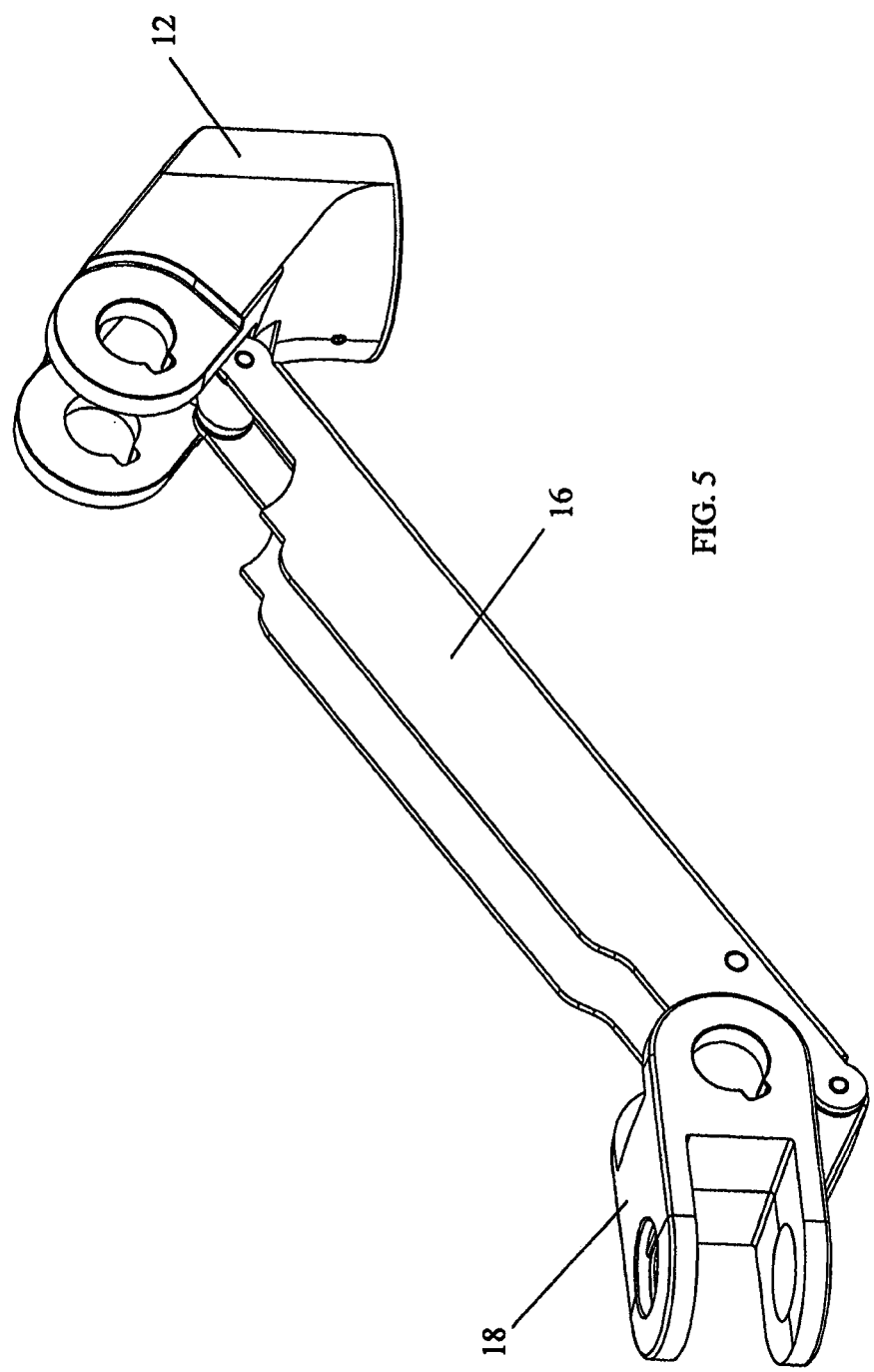
FIG. 5 is a perspective view of the lower arm attached to the first bracket and the second bracket of the embodiment shown in FIG. 1A.

FIG. 4 illustrates an embodiment of the lower arm 16, which can include a base 72 and two sidewalls 74, with the two sidewalls 74 extending from the base 72 to define a channel 76. At each end 78, 80 of the lower arm 16, aligned openings 82 extend through the sidewalls 74. As shown in FIG. 5, the aligned openings 82 allow the lower arm 16 to be pivotally mounted to the first bracket 12 and second bracket 18. Moreover, the lower arm 16 can have additional openings 84 in each sidewall 74, which are aligned and extend through each sidewall 74.

Figure 6:
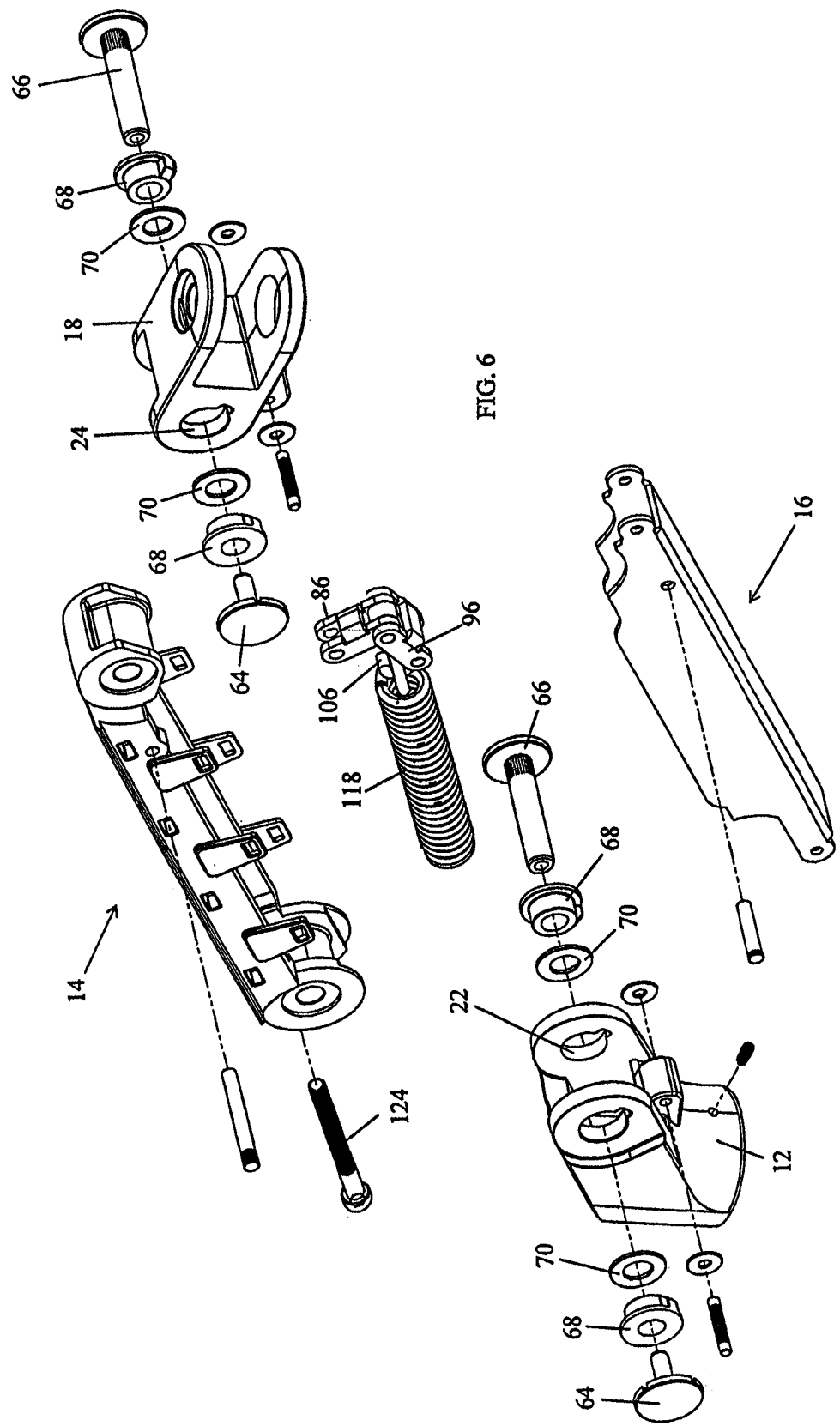
FIG. 6 is an exploded view of an assembly of the support arm shown in FIG. 1A.

FIG. 6 illustrates an exploded view of an embodiment of the adjustable support arm 10 that includes the upper arm 14, the lower arm 16, the first bracket 12, the second bracket 18, a spring 118, a linkage arrangement, and various components which allow the upper arm 14 to be pivotally connected at the first end 42 to the first bracket 12 and at the second end 44 to the second bracket 18. These components can include male mounting axles 64 and female mounting axles 66, such as knurled dowels, which are coupled together along with friction caps 68 and washers 70 to pivotally mount the first arm 14 between the first bracket 12 and the second bracket 18. The keyed openings 22, 24 of the first bracket 12 and the second bracket 18 aid to prevent loosening and/or disengagement of the mounting axles 64, 66.

As illustrated in FIGS. 7-11, an embodiment of the adjustable support arm 10 can include a first link 86 pivotally attached by a first dowel or rod 88 to the upper arm 14. The first link 86 can include a first link arm and a second link arm, which are spaced apart from each other by a bridge 94. To assemble the first link 86, the first dowel or rod 88 can be inserted, for example by press fit, through one of the additional openings 62 in one of the sidewalls 36 of the upper arm 14. The first link 86 can then be inserted on the first dowel or rod 88 and finally, to secure the first link 86, the first dowel or rod 88 can then be inserted through the other of the additional openings 62 in the other of the sidewalls 36 of the upper arm 14.

Additionally, as shown in FIGS. 7-11, the adjustable support arm 10 can include a second link 96 pivotally attached to lower arm 16 by a second dowel or rod 98. Similar to the first link 86, the second link 96 can include a first link arm and a second link arm spaced apart from each other by a bridge 104. To secure the second link 96, the second dowel or rod 98 can be inserted, for example by press-fit, through one of the additional openings 84 in one of the sidewalls 74 of the lower arm 16. The second link 96 can then be inserted on the second dowel or rod 98 and then, to secure the second link 96, the second dowel or rod 98 can be inserted through the other of the additional openings 84 in the other of the sidewalls 74 of the lower arm 16. As with the first dowel or rod 88 for the first link 86, the second dowel or rod 98 defines a pivot axis for the second link 96 in the lower arm 16.

FIGS. 7-11 illustrate an embodiment of a third link 106, which includes a hook 108 at one end. Although a hook 108 is shown, the end of the third link 106 can take the form of any other desired shape which allows for attachment of an object, including, for example, a fastener.

The first link 86, the second link 96, and the third link 106 can be pivotally connected, for example, by a link axle 110, which extends through openings 112, 114, 116 in each link 86, 96, 106. The link axle 110 is not attached to the upper arm 14 or the lower arm 16, but instead, floats in the interior of channels 38, 76 of the upper arm 14 and lower arm 16. Alternatively, the links 86, 96, 106 can be connected by pins, bolts, or any other fastener known in the art that is capable of allowing the links 86, 96, 106 to pivot.

FIGS. 7-11 further illustrate an embodiment whereby the adjustable support arm 10 includes a spring 118 to aid in supporting the weight of an attached object. As depicted in FIGS. 7-11, the spring 118 is preferably positioned in the channels 38, 76 formed in the upper arm 14 and the lower arm 16, respectively, in the depicted 20 embodiment. The second end 120 of the spring 118 can be coupled to the hook 108 of the third link 106 while the first end 122 of the spring 118 can be attached to the upper arm 14, for example, with a bolt 124 and a screw cap 126. In other embodiments, the spring 118 may be coupled directly to the linkage formed by the first and second links 86, 96. For instance, if the first and second links 86, 96 can be pivotally connected by an axle or pin and the spring 118 may be coupled directly to the axle or pin. Alternatively, the spring 118 may be coupled directly to the links 86, 98. In the embodiment shown, the spring 118 exhibits thread-like features, which allows the spring 118 to be threadingly engaged by external threads 128 of the screw cap 126. The shaft 130 of the bolt 124 extends through an aperture 132 in upper link 14 to threadingly engage internal threads 134 of the screw cap 126 while a head 136 of bolt 124 abuts the upper link 14. In this arrangement, the spring 118 can be preloaded by tightening the bolt 124 to accommodate the weight of the object mounted on the support arm 1. The spring 118 becomes stronger as the spring 118 is stretched, As the bolt 124 is tightened, the screw cap 126 is pulled along the length of the bolt 124 toward the head 136 of the bolt 124, thereby stretching the spring 118 and providing the preload. The preload on the spring 118 will depend on the weight of the object attached to the support arm 10. The heavier the attached object, the greater the preload required to accommodate the weight of the object.

The spring 118 depicted in FIGS. 7-11 is a helical extension spring or a tension spring. However, any other known elastomeric biasing device can be utilized in place of a spring, such as elastomeric bands or gas cylinders.

In alternative embodiments, the second end 120 of the spring 118 can be attached to the upper arm 14 (or lower arm 16, for instance, if a compression spring is employed) 20 with pins, bolts, or any other fasteners known in the art capable of allowing the upper and lower arms 14, 16 to pivot. The first end 122 of the spring 118 can be attached to the first, second and/or third link 86, 96, 106. In alternative embodiments, the linkage (pivotally connected first link 86, second link 96, and third link 106 (if present)) may be positioned near the first bracket 12, with the spring 118 connected between the second bracket 18 and the linkage.

When an object is mounted on the support arm 10, the weight of the object will create a torque on the support arm 10. However, the spring 118 in combination with the links 86, 96, 106, the screw cap 126, and the bolt 124 can create a constant counterbalance force to accommodate the weight of the object mounted on the upper bracket 18 thereby allowing a user to adjust the support arm 10 with constant, minimal force applied throughout a range of motion.

Figure 7:
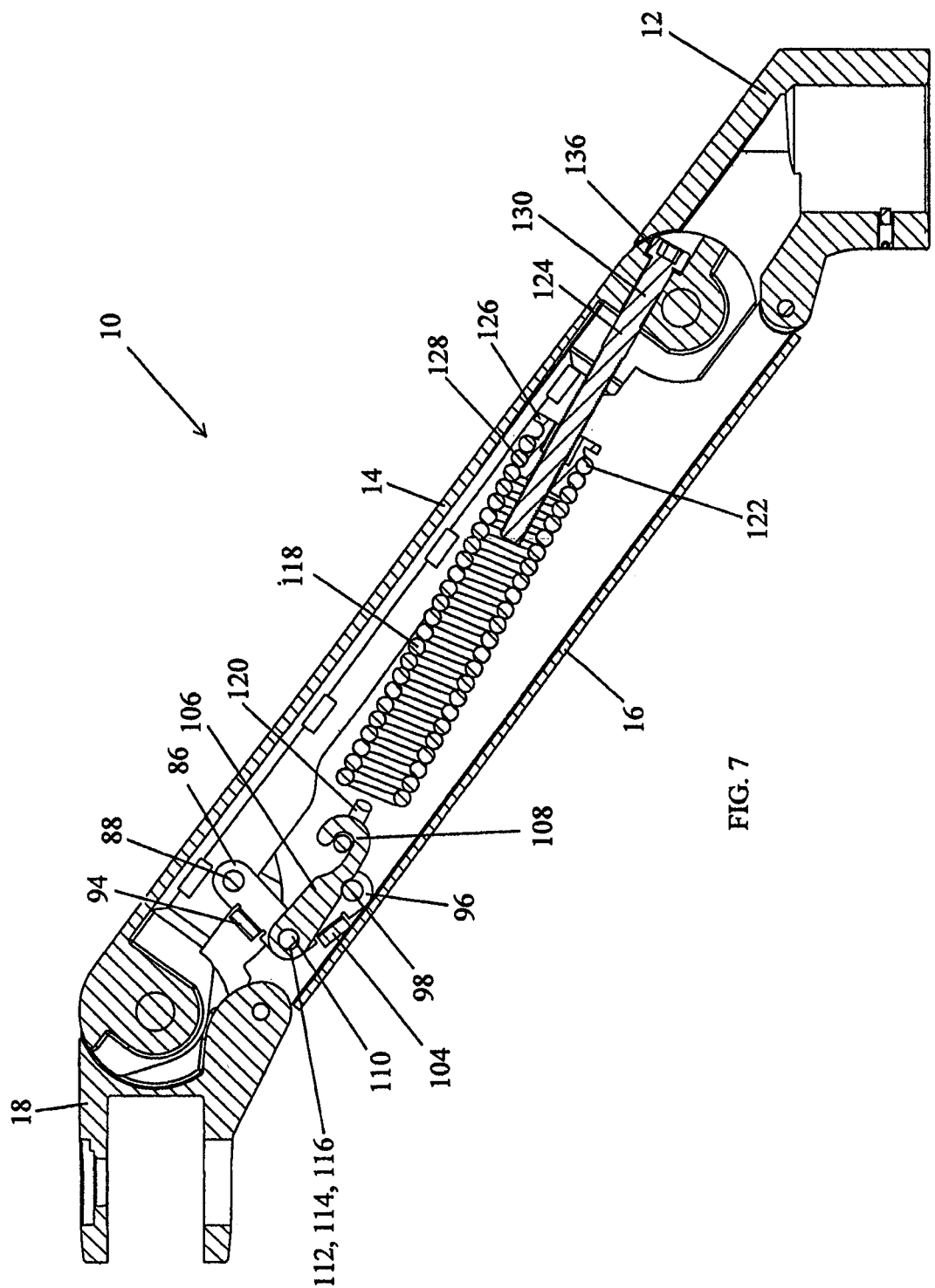
FIG. 7 is a cross-sectional view of the embodiment shown in FIG. 1A with the support arm at a maximum vertical position.
Figure 8:
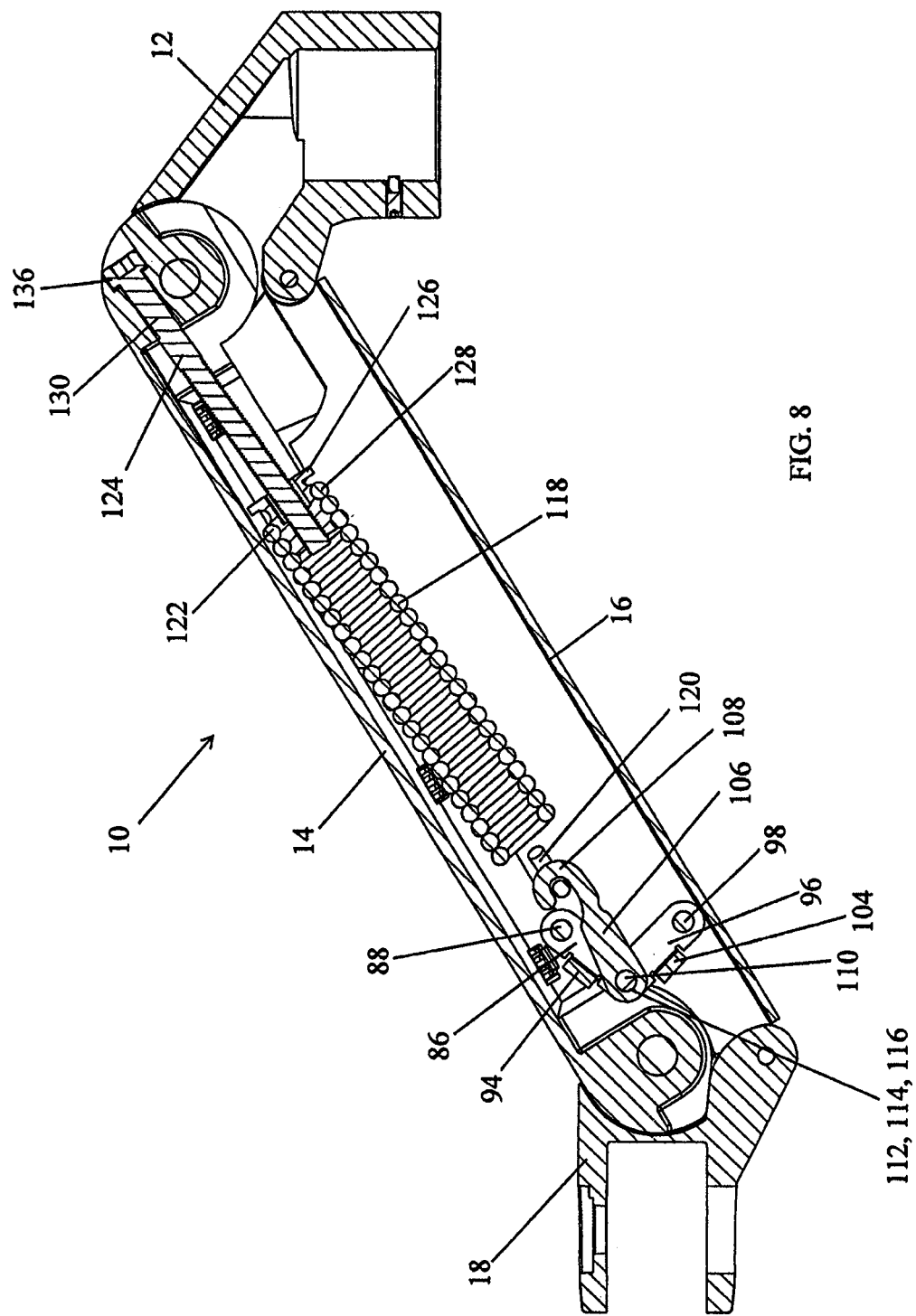
FIG. 8 is another cross-sectional view of the embodiment shown in FIG. 1A with the support arm at minimum vertical position.
Figure 9:
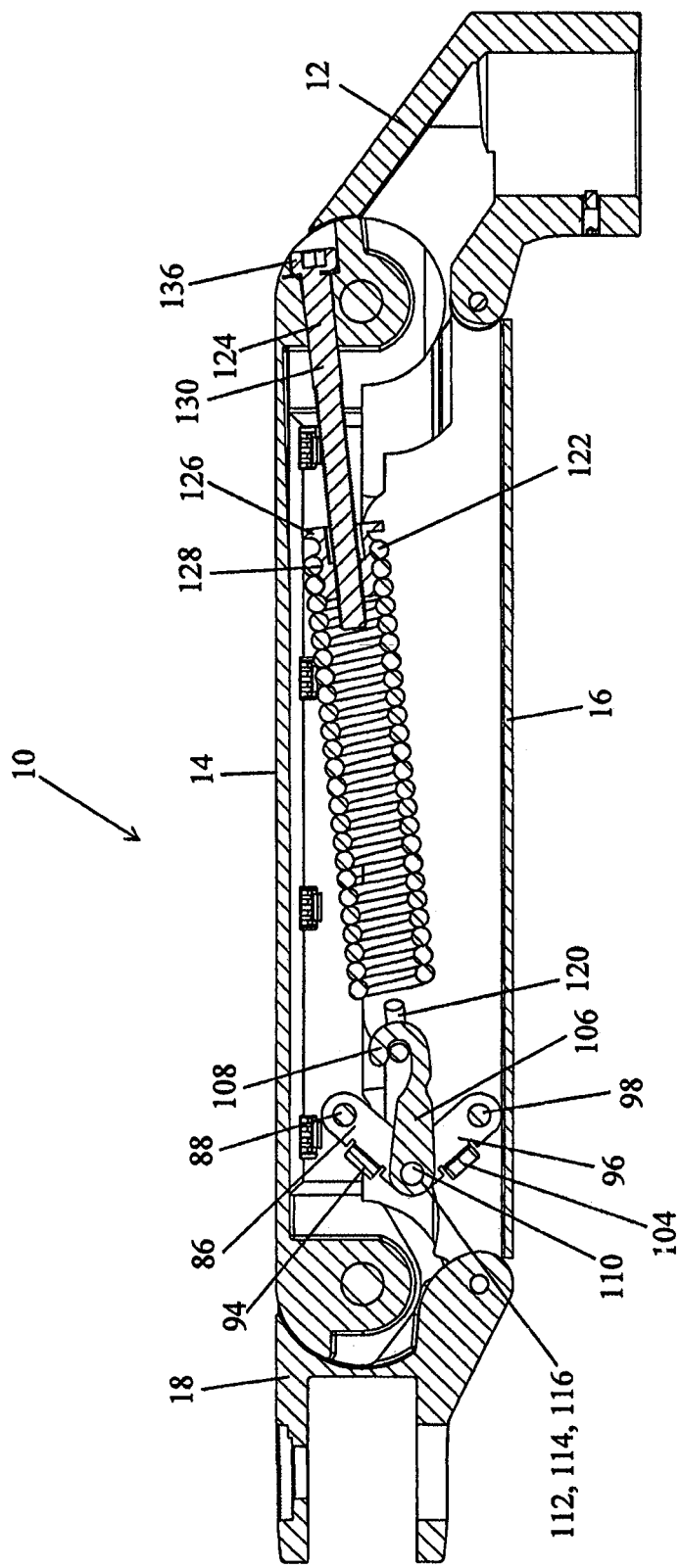
FIG. 9 is a further cross-sectional view of the embodiment shown in FIG. 1A with the support arm in a horizontal position.
Figure 10:
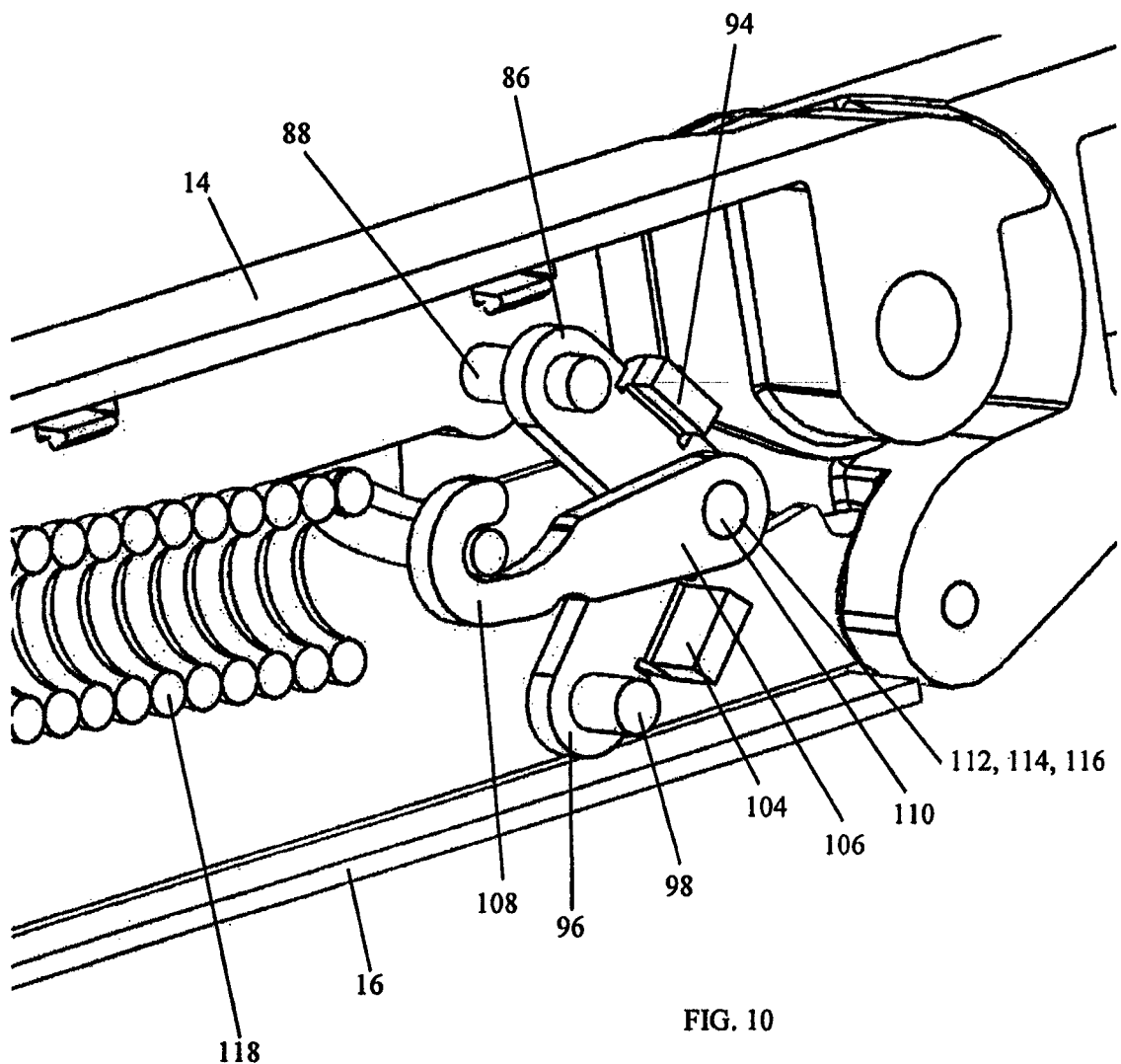
FIG. 10 is a cross-sectional view of linkage of an embodiment of the support arm.
Figure 11:
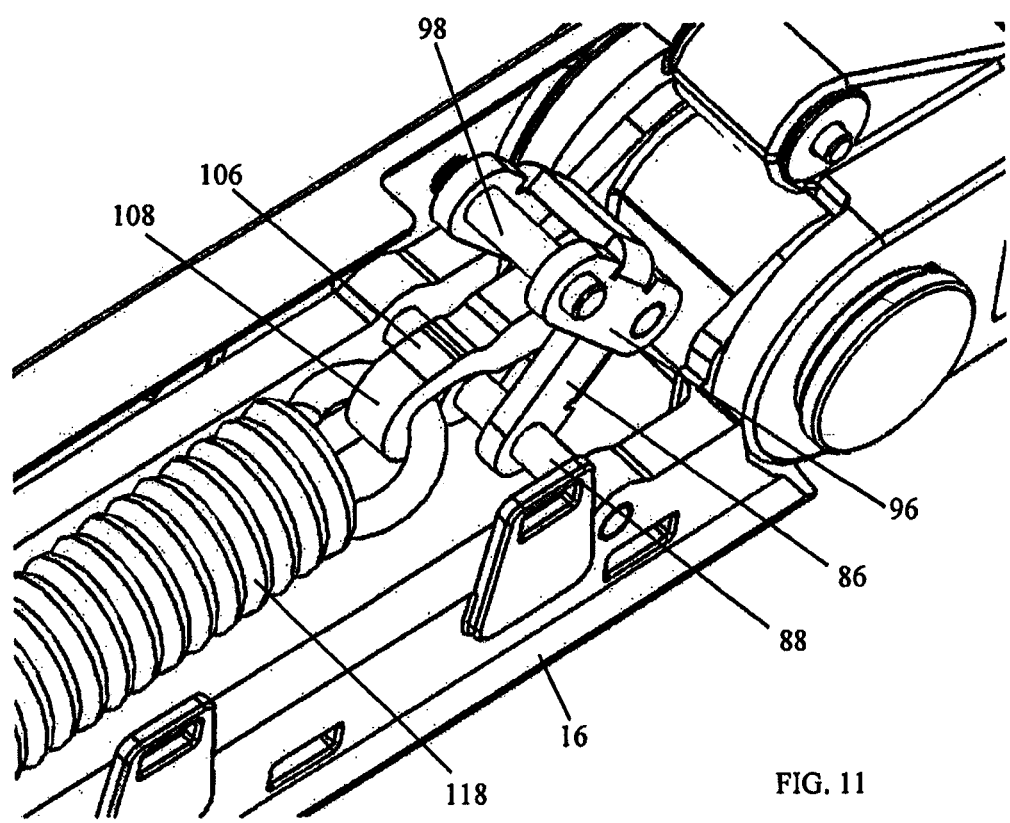
FIG. 11 is a perspective view of the linkage shown in FIG. 10.
Figure 12:
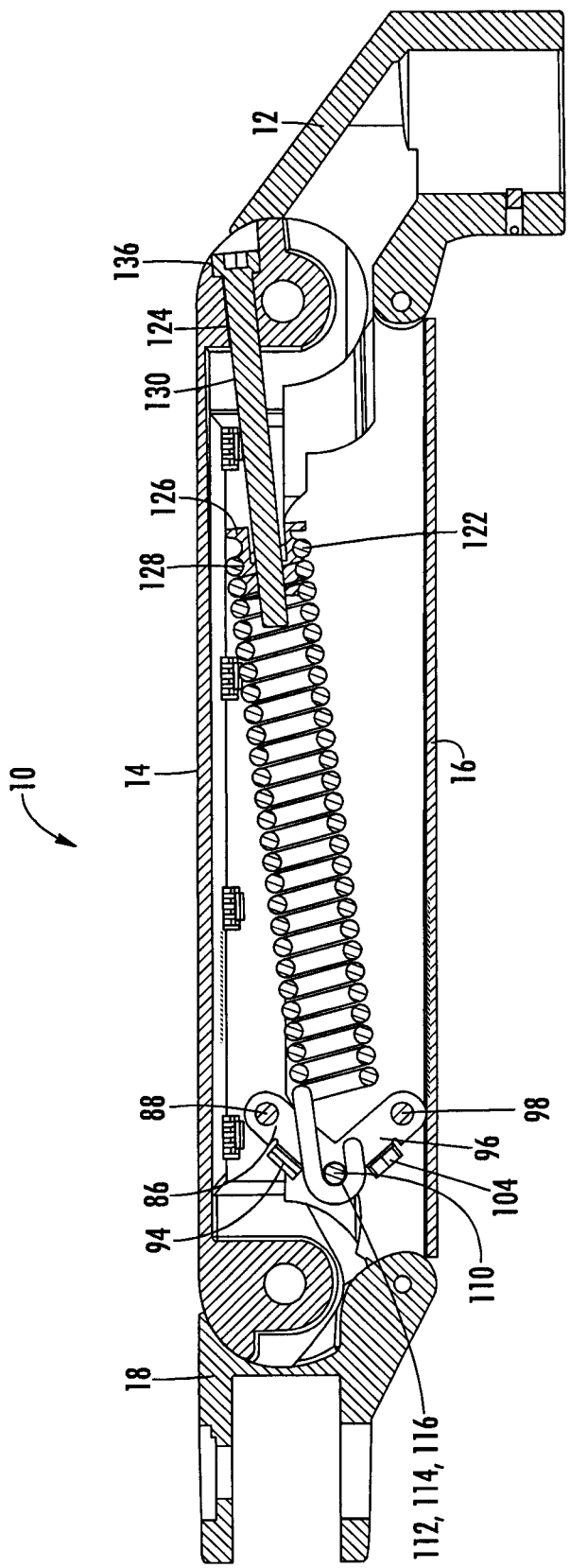
FIG. 12 is a cross-sectional view of an alternative embodiment of the support arm with the support arm in a horizontal position.

As the support arm 10 pivots, the links 86, 96, 106, the link axle 110 and spring 118 can move or translate dynamically between a raised position as shown in FIG. 7 (e.g., the highest position of the arm 10), a horizontal position as shown in FIG. 9 (e.g., the mounting location of the upper arm 14 and the lower arm 16 to the first bracket 12 and the second bracket 18, are substantially in a vertical plane when the support arm 10 is positioned horizontally, wherein the third link 106 is located between the first bracket 12 and the pivot axis of the upper and lower links 86, 96), and a lowered position as shown in FIG. 8 (e.g., a lowest position of the support arm 10) in the interior of the support arm 10. The movement between positions can result in a change in the angle of the spring 118, a change in the tension of the spring 118 and, hence, a change in the angle of counterbalancing force exerted by the spring 118. Thus, with the spring 118 positioned at an angle in the support arm 10, as shown in FIGS. 7-9, the spring 118 can exert a counterbalancing force throughout the range of motion of the adjustable support arm 10, even when the arm 10 is in the horizontal position so as to create a constant force at the end of the support arm 10 attached to an object. The path traveled by the link axle 110 between the first and second position, as the support arm 10 is adjusted vertically, will be governed by the geometry of the links 86, 96, 106, (e.g., the length of the respective links 86, 96, 106 and the position of the proximal ends of the respective links 86, 96, 106 (that is, the respective positions of the pivot axis of the first link 86 in the upper arm 14 and the pivot axis of the second link 96 in the lower arm 16)) and the position of the upper 14 and lower arms 16. As shown in an embodiment herein, the first link 86 and the second link 96 are of equal length. The distance between a vertex created at the axle 110 and the second dowel or rod 98 remains constant as the support arm 10 is raised and lowered, and the distance between the axle 110 and the first dowel or rod 88 remains constant as well. However, the distance between the first dowel or rod 88 changes as the support arm 10 is raised and lowered, thereby defining a variable angle α between the spring's longitudinal axis and the upper arm 14. When the support arm 10 is in a raised position (See FIG. 7), the angle α increases (e.g., α=7°), causing the length of the distance between the first and second dowel or rod 88, 98 to lengthen. However, when the support arm 10 is brought to a lowered position (see FIG. 8), the angle α decreases (e.g., α=5°), causing the length of the distance between the first and second dowel or rod 88, 98 to shorten.

It is noted that FIGS. 7-11 depict only an embodiment of the adjustable support arm 10 and that there are multiple choices of link lengths and/or different choices for the location the pivot axis of the first and second links 86, 96 in the upper and lower arms 14, 16 (e.g., the mount locations in the upper and lower arms 14, 16, respectively). Additionally, with a given linkage geometry, the applied support or counter torque can be further modified by changing the spring's characteristics (e.g., modify the spring stiffness or the spring constant), or the spring attachment point at the end of the spring distal from the linkage (thereby changing the spring angle in the arm). Further, the link axle 110 may be positioned between the pivot axis of the first and second links 86, 96, or be positioned between the lower bracket 16 and pivot axis of the first and second links 86, 96 (all in reference to the support arm 10 in the horizontal position, for ease of understanding). The linkage geometry, spring attachment position, and spring characteristics can be selected to achieve the desired response of the support arm. Additionally, the geometry of the upper arm and lower arm with respect to the first and second brackets may be modified to create a different parallelogram structure than that depicted, or even a structure which is not a parallelogram.

When an extension or tension spring is used, it is preferable that the spring be angled in the direction shown in FIGS. 7-9 (the degree of the angle will affect the amount of counterbalancing force supplied). If a compression spring is used, the angled direction of the spring can be reversed (i.e., the end of the spring closest to the first bracket 12 would be lower than that of the end of the spring closest to the second bracket 18 when the support arm 10 is in a horizontal position). In this configuration, it may be more convenient to locate the linkage near the first bracket 12 and place the tension adjusting mechanism on the lower arm 16 near the second bracket 18. The preload on the spring 118 will depend on the weight of the object attached to the support arm 10. The heavier the attached object, the greater the preload required to accommodate the weight of the object.

The embodiment of the adjustable support arm 10 depicted herein features a first link 86 and a second link 96 of equal lengths, with the pivot axis of the first link 86 and the second link 96 being substantially in a vertical plane when the adjustable support arm 10 is in a horizontal position. That is, the two pivot axes are offset in the vertical direction, and lie in a vertical plane (i.e., are not offset in the horizontal direction). In this embodiment, the tension on the spring 118 remains constant throughout the range of motion of the support arm 10. In another embodiment, the first link 86 pivot axis in the upper arm 14 may be more proximate to the second bracket 18 than the second link 96 pivot axis in the lower arm 16. Alternatively, the second link 96 pivot axis may be more proximate to the second bracket than the first link 86 pivot axis.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:
1. An adjustable support arm, comprising:
a parallelogram linkage, the parallelogram linkage comprising an upper arm and a lower arm, wherein the upper arm is parallel to the lower arm, and wherein the upper arm and lower arm each have first and second ends;

a V-shaped linkage, the v-shaped linkage comprising a first link and a second link, wherein a first end of the first link is pivotally connected to the upper arm at a position between the first end and the second end of the upper arm, wherein a first end of the second link is pivotally connected to the lower arm at a position between the first end and the second end of the upper arm, and wherein the second end of the first link is pivotally connected to the second end of the second link to define a vertex of the V-shaped linkage; and a spring coupled to the vertex of the V-shaped linkage.

2. The adjustable support arm of claim 1, wherein the adjustable support arm further comprises: a base bracket pivotally attached to the first ends of the upper and lower arms; and a device mount bracket pivotally attached to the second ends of the upper and lower arms.

3. The adjustable support arm of claim 1, wherein the spring has a variable length, with the variable length of the spring being greater at a lowered position relative to a raised position, wherein the lowered position is defined by the device mount bracket being positioned at a height below the base bracket, and wherein the raised position is defined by the device mount bracket being positioned at a height above the base bracket.

4. The adjustable support arm of claim 1, wherein the V-shaped linkage further comprising a third link for coupling the spring to the vertex of the V-shaped linkage, wherein the third link has a first end connected to the second end of the spring and has a second end connected to the vertex of the V-shaped linkage.

5. An adjustable support arm, comprising:

a base bracket;

a device mount bracket;

an upper arm comprising a base wall interconnecting two sidewalls, wherein a first end of the upper arm is connected to the base bracket and a second end of the upper arm is connected to the device mount bracket;

a lower arm comprising a base wall interconnecting two sidewalls, wherein a first end of the lower arm is connected to the base bracket and a second end of the lower arm is connected to the device mount bracket;

a V-shaped linkage positioned between the upper and lower arms, the v-shaped linkage comprising an upper link and a lower link, wherein a first end of the upper link is pivotally connected to the two sidewalls of the upper arm at a position between the first and second ends of the upper arm; wherein a first end of the lower link is pivotally connected to the two sidewalls of the lower arm at a position between the first and second ends of the lower arm; and wherein the second end of the upper link pivotally attached to the second end of the lower link to form a vertex of the V-shaped linkage; and a spring having a first end and a second end, wherein the second end of the spring is coupled to the vertex of the V-shaped linkage.

6. The adjustable support arm of claim 5, wherein the spring has a variable length, with the variable length of the spring being greater at a lowered position relative to a raised position, wherein the lowered position is defined by the device mount bracket being positioned at a height below the base bracket, and wherein the raised position is defined by the device mount bracket being positioned at a height above the base bracket.

7. The adjustable support arm of claim 5, wherein the first end of the spring is attached to the first end of the upper arm.

8. The adjustable support arm of claim 6, wherein the V-shaped linkage further comprising an extension link for coupling the spring to the vertex of the V-shaped linkage, wherein the extension link has a first end connected to the second end of the spring and has a second end connected to the vertex of the V-shaped linkage.

9. An adjustable support arm, comprising:

a parallelogram linkage, the parallelogram linkage comprising: a base bracket; a device mount bracket; an upper arm having a first end connected to the base bracket and a second end connected to the device mount bracket; a lower arm having a first end connected to the base bracket and a second end connected to the device mount bracket, wherein the lower arm is parallel to the upper arm;

a V-shaped linkage, the V-shaped linkage comprising upper and lower links, wherein a first end of the upper link is pivotally connected to the upper arm at a position between the first and second ends of the upper arm; wherein a first end of the lower link is pivotally connected to the lower arm at a position between the first and second ends of the lower arm; and wherein a second end of the upper link is pivotally connected to a second end of the lower link to form a vertex; and a spring having a first end and a second end, wherein the second end of the spring is attached to the vertex of the V-shaped linkage to provide a dynamic attachment point for the second end of the spring.

* * * * *